United States Patent
Grant

(10) Patent No.: US 11,791,988 B2
(45) Date of Patent: Oct. 17, 2023

(54) USE OF RANDOM ENTROPY IN CRYPTOGRAPHY

(71) Applicant: Theon Technology LLC, Newport Beach, CA (US)

(72) Inventor: Robert Edward Grant, Laguna Beach, CA (US)

(73) Assignee: Theon Technology LLC, Newport Beach, CA (US)

( * ) Notice: Subject to any disclaimer, the term of this patent is extended or adjusted under 35 U.S.C. 154(b) by 0 days.

(21) Appl. No.: 17/533,049

(22) Filed: Nov. 22, 2021

(65) Prior Publication Data

US 2023/0163951 A1 May 25, 2023

(51) Int. Cl.
*H04L 9/06* (2006.01)
*H04L 9/08* (2006.01)

(52) U.S. Cl.
CPC .......... *H04L 9/0656* (2013.01); *H04L 9/0872* (2013.01)

(58) Field of Classification Search
CPC .............................. H04L 9/0656; H04L 9/0872
See application file for complete search history.

(56) References Cited

U.S. PATENT DOCUMENTS

| | | | |
|---|---|---|---|
| 5,033,352 A * | 7/1991 | Kellogg | G10H 1/0575 84/DIG. 10 |
| 5,764,772 A | 6/1998 | Kaufman | |
| 5,966,445 A | 10/1999 | Park | |
| 5,987,483 A * | 11/1999 | Edelkind | G06F 7/588 708/250 |
| 6,072,876 A | 6/2000 | Obata | |
| 6,154,541 A | 11/2000 | Zhang | |
| 6,396,928 B1 | 5/2002 | Zheng | |
| 6,480,605 B1 | 11/2002 | Uchiyama | |
| 6,636,968 B1 | 10/2003 | Rosner | |
| 6,751,736 B1 | 6/2004 | Bowman | |
| 6,763,364 B1 * | 7/2004 | Wilber | G06F 7/58 708/255 |
| 6,990,200 B1 | 1/2006 | Kasahara | |
| 7,502,754 B2 | 3/2009 | Campbell | |
| 8,468,244 B2 | 6/2013 | Redlich | |
| 8,516,244 B2 | 8/2013 | Waters | |
| 8,885,820 B1 | 11/2014 | Ambert | |
| 9,450,749 B2 * | 9/2016 | Hammersmith | H04L 9/0822 |

(Continued)

FOREIGN PATENT DOCUMENTS

| | | | |
|---|---|---|---|
| EP | 1220174 | 7/2002 | |
| EP | 1220174 A1 * | 7/2002 | A63F 3/081 |

(Continued)

OTHER PUBLICATIONS

Bhaumik, et al. "Safely Doubling your Block Ciphers for a Post-Quantum World," Inria, Paris. 2020. 49 pages.

(Continued)

*Primary Examiner* — Lynn D Feild
*Assistant Examiner* — Abdullah Almamun
(74) *Attorney, Agent, or Firm* — Fish IP Law, LLP

(57) ABSTRACT

A system that uses a computing device to encrypt data by obtaining multiple series of random numbers, and then time-correlating these series to form a series of composite elements. By selecting a section of the series of composite elements, the computing device can obtain a key for encrypting data.

12 Claims, 5 Drawing Sheets

(56) References Cited

U.S. PATENT DOCUMENTS

| | | | |
|---|---|---|---|
| 10,230,703 | B1 | 3/2019 | Lepore |
| 10,476,665 | B1 | 11/2019 | Griffin |
| 10,911,451 | B2 | 2/2021 | Costa |
| 11,188,977 | B2 | 11/2021 | Youb |
| 11,443,310 | B2 | 9/2022 | Bolla |
| 2003/0081785 | A1 | 5/2003 | Boneh |
| 2003/0115449 | A1 | 6/2003 | Yochim |
| 2004/0096056 | A1 | 5/2004 | Boren |
| 2006/0072745 | A1 | 4/2006 | Fukaya |
| 2006/0177065 | A1* | 8/2006 | Halbert ............... H04L 9/0662 380/277 |
| 2007/0211893 | A1 | 9/2007 | Frosik |
| 2008/0107274 | A1 | 5/2008 | Worthy |
| 2008/0208560 | A1 | 8/2008 | Johnson |
| 2009/0094464 | A1* | 4/2009 | Futa .................. H04L 9/3252 713/189 |
| 2010/0119061 | A1 | 5/2010 | Kawale |
| 2012/0134495 | A1* | 5/2012 | Liu ................... H04L 9/0656 380/46 |
| 2012/0213358 | A1* | 8/2012 | Dror ..................... G06F 7/588 331/46 |
| 2013/0142323 | A1* | 6/2013 | Chiarella ................ G06F 7/58 380/28 |
| 2013/0297937 | A1 | 11/2013 | Fransen |
| 2014/0112469 | A1 | 4/2014 | Layne |
| 2016/0012252 | A1* | 1/2016 | Deleeuw ............. G06F 21/6254 726/26 |
| 2017/0222804 | A1 | 8/2017 | Dewitt |
| 2017/0302446 | A1 | 10/2017 | Thorwirth |
| 2017/0310650 | A1 | 10/2017 | McMullen |
| 2018/0101322 | A1 | 4/2018 | Cheriton |
| 2018/0131526 | A1 | 5/2018 | Ellingson |
| 2019/0036678 | A1 | 1/2019 | Ahmed |
| 2019/0089532 | A1 | 3/2019 | Lambert |
| 2019/0120929 | A1 | 4/2019 | Meadow |
| 2019/0238323 | A1 | 8/2019 | Bunch |
| 2020/0084037 | A1 | 3/2020 | Zhang |
| 2020/0136819 | A1* | 4/2020 | Bae .................... H04L 9/3066 |
| 2020/0241841 | A1* | 7/2020 | Tamiya ................ G06F 7/584 |
| 2020/0293212 | A1 | 9/2020 | Narayanamurthy |
| 2020/0366652 | A1 | 11/2020 | Koyun |
| 2020/0396059 | A1 | 12/2020 | Micali |
| 2021/0028935 | A1* | 1/2021 | Wu ..................... H04L 9/3278 |
| 2021/0382695 | A1* | 12/2021 | Chang ................... G06F 7/582 |
| 2023/0007439 | A1 | 1/2023 | Williams |
| 2023/0163952 | A1* | 5/2023 | Grant .................. H04L 9/0656 380/28 |

FOREIGN PATENT DOCUMENTS

| | | | |
|---|---|---|---|
| EP | 260488 | 8/2019 | |
| JP | 2007157288 | 6/2007 | |
| WO | 0065768 | 11/2000 | |
| WO | 2000065768 A1 | 11/2000 | |
| WO | 2005085992 | 9/2005 | |
| WO | WO-2005085992 A1 * | 9/2005 | ............. G06F 7/588 |
| WO | 2016203762 | 12/2016 | |
| WO | 2019110955 | 6/2019 | |
| WO | 2019110955 A1 | 6/2019 | |
| WO | WO-2019110955 A1 * | 6/2019 | ........... H04L 63/067 |

OTHER PUBLICATIONS

"Elliptic Curve Cryptography (Ecc)." 1 page.
"Elliptic Curve Over Finite Non-Prime Fields," Mathematics. 2 pages.
"Golden Ratio Calculator," Good Calculators. 2 pages.
Grant, et al. "Accurate and Infinite Prime Prediction from Novel Quasi-Prime Analytical Methodology." 8 pages.
Grant, Robert E. "Prime Number Pattern Discovery," Discoveries, Publications, Unified Math/Physics. Jul. 2018. 6 pages.
Kumar, et al. "A Symmetric Mecial Image Encryption Scheme Based on Irrational Numbers," Biomed Res 2018 Special Issue. S494-S498. 5 pages.
Grant, et al. "Reciprocal Wave Factorization," Strathspey Crown Holdings. Jun. 2020. 19 pages.
Barker, et al. "Recommendation for Pair-Wise Key Establishment Schemes Using Discrete Logarithm Cryptography," NIST. Apr. 2018. 2 pages.
Weisstein, Eric W. "Taniyama-Shimura Conjecture," Mathworld—A Wolfram Web Resource. 3 pages.
Wang, et al. "A Decentralized Electricity Transaction Mode of Microgrid Based on Blockchain and Continuous Double Action," IEEE. 2018. 5 pages.
"Why Are Elliptic Curves Constructed Using Prime Fields and Not Composite Fields?" https://crypto.stackexchange.com. 3 pages.
"Why is a Prime Numer Used in ECDSA?" https://crypto.stackexchange.com/. 3 pages.
Wu, et al. "Forensic Analysis of Bitcoin Transactions," IEEE. 2019. 3 pages.
Burd, Barry. "A New Approach to Condensing Data Leads to a 99% Compression Rate," TechTarget. May 2015. 9 pages.
Zhang, et al. "A Blockchain-Based Authentication Method with One-Time Password," IEEE, 2019. 9 pages.

* cited by examiner

|  | C1 | C2 | C3 | C4 | C5 | C6 | C7 |
|---|---|---|---|---|---|---|---|
| A1 | | | | | | | |
| A2 | | | | | | | |
| A3 | | | | | | | |
| A4 | | | | | | | |
| A5 | | | | | | | |
| A6 | | | | | | | |
| A7 | | | | | | | |
| ... | | | | | | | |

Columns: $C = A \times TS \times Tempo$

Rows: $A = Trigonometric(TS/frequency)$

*Figure 3*

USE OF RANDOM ENTROPY IN CRYPTOGRAPHY

FIELD OF THE INVENTION

The field of the invention is data security.

BACKGROUND

The background description includes information that may be useful in understanding the present invention. It is not an admission that any of the information provided herein is prior art or relevant to the presently claimed invention, or that any publication specifically or implicitly referenced is prior art.

The popularity of cryptocurrencies in recent years has inspired many to seek other potential uses for blockchain for other applications. Private blockchains allow for the storage of sensitive information. However, access management for this information is cumbersome, especially as the blockchains get bigger and bigger.

For shared data sets such as in a blockchain system, a system must be able to secure the data while being flexible enough to allow users proper access to the data. Unfortunately, this creates complexity where the system must juggle many separate keys for all users, and be constantly updating each.

One-time pads for passwords are known to be have a high level of security. However, the use of one-time pads requires that the keys be shared between the parties ahead of time, and only be used once. This means that for many exchanges, the parties must have a priori storage of many keys. The difficulties associated with these requirements has resulted in favoring the public key cryptography schemes over one-time pad schemes.

Moreover, full keys of one-time key pads can be very memory-intensive. Keys can be as large as the data they are meant to encrypt. As the data sets and keys become larger and larger, it becomes increasingly difficult to store these large data sets and transmission of the encrypted data and keys becomes more demanding on data transmission networks.

Others have attempted to solve this problem.

WO 20190110955 to Bryant discusses the use of a one-time pad for password generation. However, the solution in Bryant requires the storage of all of the passwords in a large pad, which is resource intensive.

WO 00/65768 to Persson discusses determining a maximum key length. However, the generation of the shortened key in Persson is performed in such a way that a function can still only be used once.

Thus, there is still a need for a system that securely protects a shared data set while adeptly providing the correct access to its users, as well as reducing the data and transmission requirements for their use.

SUMMARY OF THE INVENTION

The inventive subject matter provides apparatus, systems and methods in which a computing device produces highly random numbers using a combination of (1) and AI interface, (2) a functions table, and (3) a random bits generator.

The inventive subject matter also provides apparatus, systems and methods in which a computing device obtains at least a first, second and third series of random numbers and time-correlates these series of random numbers to produce a series of composite elements. A section of this series composite elements is used as a key to encrypt (and correspondingly, decrypt) data.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWING

FIG. 3 provides a schematic representation of a small part of the Functions Table, according to embodiments of the inventive subject matter.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
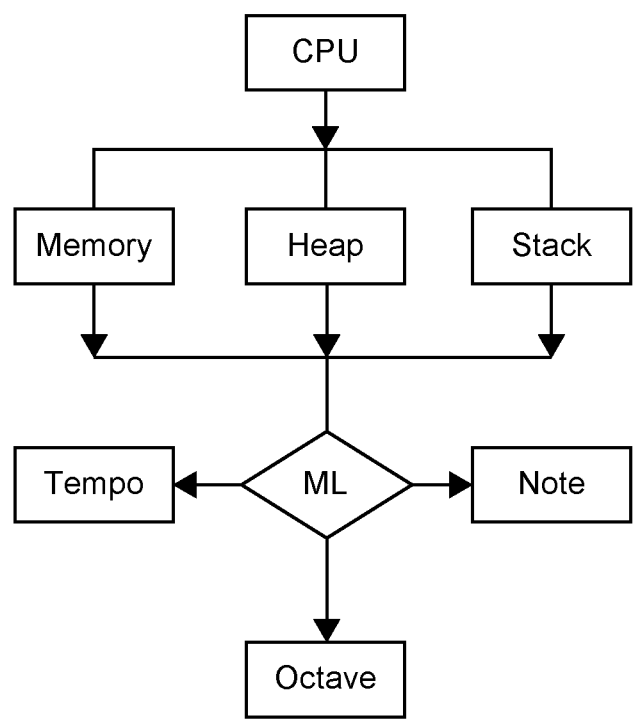
FIG. 1 is a diagrammatic overview of a system according to various embodiments of the inventive subject matter.

FIG. 1 provides a diagrammatic overview of a system 100 according to embodiments of the inventive subject matter.

The inventive subject matter provides apparatus, systems and methods in which a computing device produces highly random numbers using a combination of (1) and AI interface, (2) a functions table, and (3) a random bits generator.

A preferred embodiment of the inventive system and method is referred to herein from time to time as CrownRNG™. The CrownRNG™design exploits the by-default randomness of irrational numbers.

Mathematically speaking, irrational numbers are those numbers that cannot be expressed as ratios of two or more rational numbers. They are proven to have digital sequences, also known as mantissas, that extend to infinity without ever repeating. Therefore, they are excellent sources for true randomness1.

Mathematical functions known to generate irrational numbers include the square roots of non-square numbers, e.g., square roots of prime numbers, ?20, ?35, etc., and also trigonometric functions having natural numbers for their arguments, among many other. (Please refer to Appendix A for a list of some irrational numbers' generating functions).

The basic idea behind CrownRNG is to use the power of artificial intelligence (AI) to create mathematical functions able to generate random irrational numbers. The irrational numbers will function as parameters to be used to generate highly randomized sequences of binary bits that are suitable for encryption purposes.

The CrownRNG unit generally comprises three main components:
1—An AI interface.
2. A Functions Table.
3. A Random Bits Generator (RBG).

1. The AI Interface:

The AI interface utilizes the learning capabilities of artificial intelligence to learn how to generate randomized parameters needed by the system.

The AI is initialized by a set of CPU metrics coming from the hosting PC. It uses these metrics as initial features to learn from and to then evolve via linear-regression-based Machine-Learning (ML) algorithm.

One branch of the AI, the MusicAI, will compose random music pieces that will transform into a set of numbers corresponding to the octaves, notes, and tempi of the music piece. These three values are then converted, via digital root arithmetic, into specific ranges such that they can be utilized by the Functions Table.

The other branch of the AI, the MathAI, uses ML to create ever-changing mathematical formulae tuned to create random non-square numbers (N). The square roots of these non-square numbers create numbers with irrational mantissas. These irrational numbers will be truncated to specific bit-lengths dictated by the private keys' security level and then will be passed on to the RBG as seeds.

The MusicAI:

The main workflow of the MusicAI can be summarized as follows:

First, three parameters of the CPU are collected: the allocated memory, allocated heap, and stack. These three values will be collected in intervals of 1 millisecond for a total of 5 seconds. This will generate 5000 data points for each.

Next, the AI will start doing supervised machine learning on these values, treating two as features and one as the predicted label.

Using a linear regression model, two features, let say the memory and heap, will learn to predict the stack label, then the model will collect new values for the features and start predicting the heap label. The same machine-learning algorithm will be used, but with the labels being the other two features instead.

So, in total, we have three AI algorithms working simultaneously to predict three labels, memory, heap, and stack.

The three predicted values are truncated, using modular math, into specific values depending on their allocated variables, as shown in the table below.

TABLE.1

The features/labels transformation of the CPU metrics.

| Features | Label | Variable | Mod |
|---|---|---|---|
| Heap | Memory | Stack | Note | 7 |
| Heap | Stack | Memory | Tempo | 6 |
| Memory | Stack | Heap | Octave | 12 |

The stack values will be allocated to the note variable and hence be truncated to mod(7), in other words, eight values from 0 to 7. The memory values will transform into the tempo using mod(6), and finally, the heap variables will transform into the octave, using mod(12). These three values will then pass on to the function table, as we to be explained later.

1. The MathAI:

The MathAI shares the same supervised machine learning algorithm with the MusicAI. However, for this case, the three predicted values of the memory, heap, and stack are truncated using mod(10). The operation is repeated, and the values are concatenated to form one single number of a specific length, specified by the programmer.

A single-digit of either [2, 3, 7, 8] is randomly chosen and then added to the end of the concatenated number, whenever needed, to ensure that the number is not a perfect square. This is because no number, when squared, will end with either of these four digits. The final number is then square-rooted and passed on to the next element.

In summary, the AI outputs the following parameters:
  a. The irrational seed. An infinite irrational number truncated to a specific length.
  b. The tempo, note, and octave parameters in the ranges of (0-7), (0-8), and (0-13), respectively.

Figure 2:
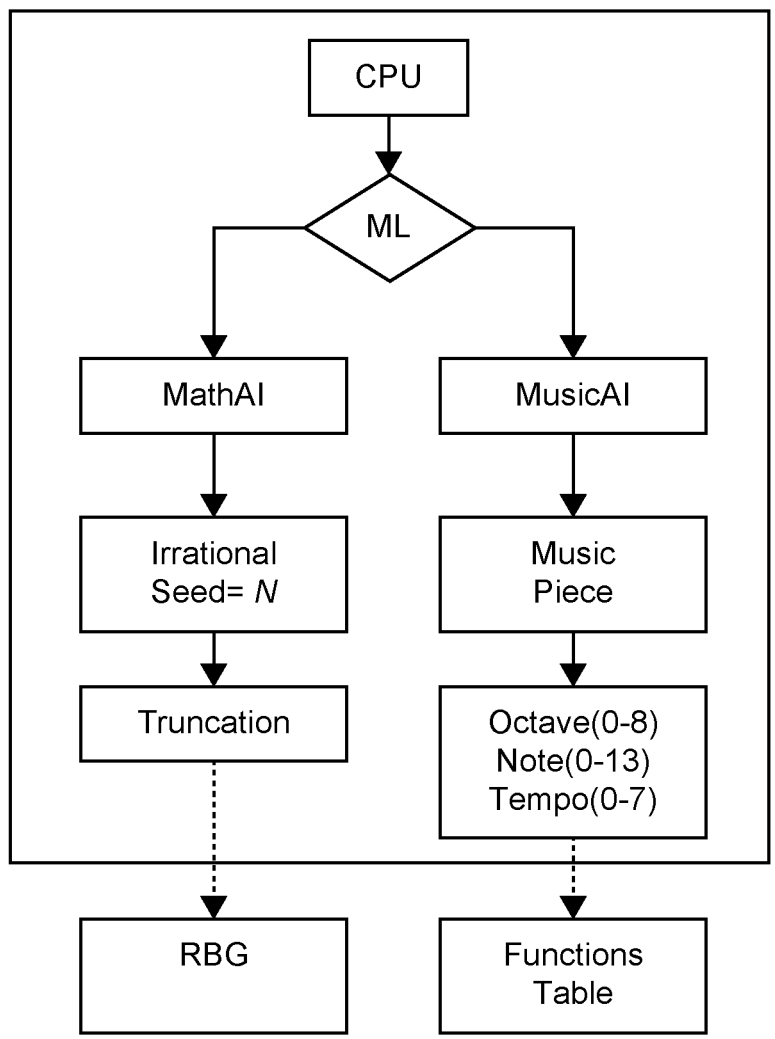
FIG. 2 provides a schematic representation of the AI general workflow, according to embodiments of the inventive subject matter.
Figure 4:
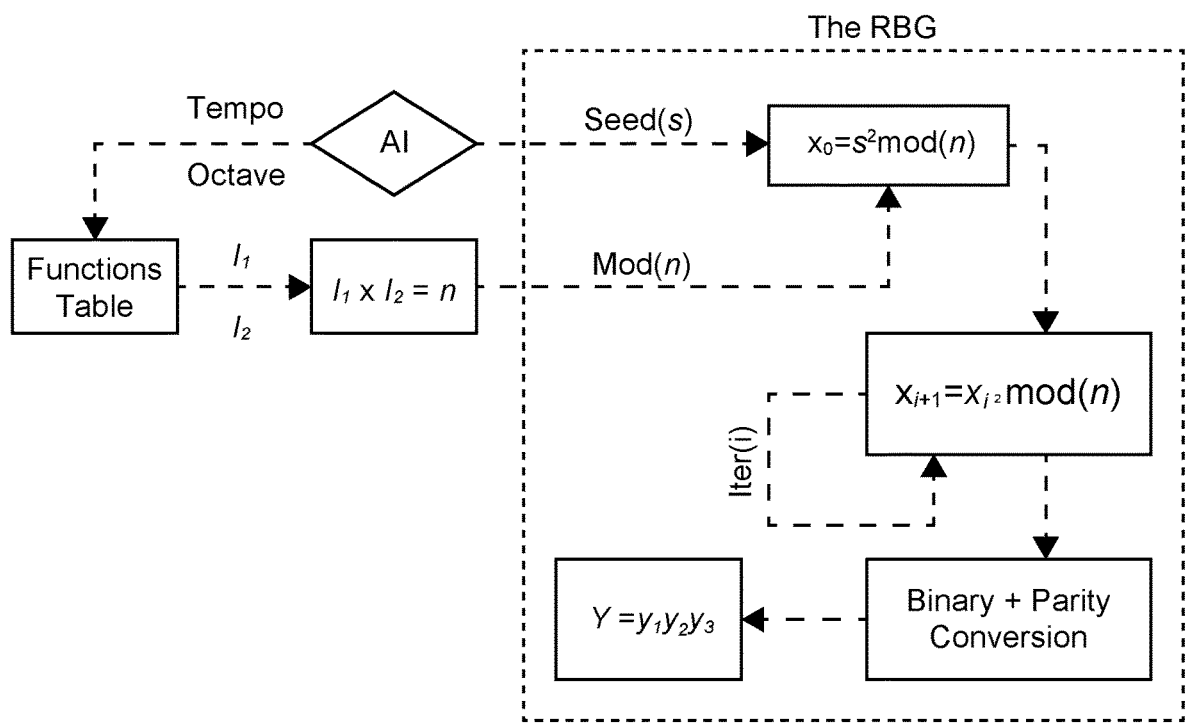
FIG. 4 provides a schematic representation of the RBG workflow, according to embodiments of the inventive subject matter.

FIG. 2 shows a schematic rendering of the workflow of the AI.

2. The Functions Table

The Functions Table is defined by a set of horizontal and vertical variables that are mathematical functions proven to always produce perfect irrational numbers. The arguments of these functions are not fixed, determined by the random internal states, mainly the timestamp of the current time, as well as the tempo variable.

The tempo, note, and octave parameters coming out of the AI will be used to determine which two cells on the vertical and horizontal axis will be utilized for the current run. The output of these cells (the irrational mantissas) will then be truncated accordingly and used to compute the arithmetic mode by which the RBG will operate.

For our current model, we use the square root function on the horizontal axis of the table and trigonometric ones on the vertical axis.

There are seven cells on the horizontal axis (FIG. 2), with the argument of the square roots being the product of the tempo value, the timestamp (TS), and a non-square number (A) as follows: sqrt (TS x Tempo x A). (This non-square number A is not the same as the N used to generate the seed.)

The horizontal scale is made of 104 cells corresponding to 13 octaves, with each octave divided into eight notes. The octave parameter will first select one of the 13 octaves, and then the note parameter will select which note of this specific octave will be used. Each note corresponds to a trigonometric function having an argument made of the time stamp divided by a specific frequency value: TS/fr.

The trigonometric functions, along with the frequencies of the notes of the 13 octaves, are listed in the table below.

TABLE 2

A list of the trigonometric functions used along with the music frequencies of each octave.

| Sin | 432 × 100 | 450 | 468 | 252 | 270 | 288 | 306 | 324 | 342 | 360 | 378 | 396 | 414 |
|---|---|---|---|---|---|---|---|---|---|---|---|---|---|
| Cos | 864 × 100 | 900 | 936 | 504 | 540 | 576 | 612 | 648 | 684 | 720 | 756 | 792 | 828 |
| Tan | 1728 × 10 | 1800 | 1872 | 1008 | 1080 | 1152 | 1224 | 1296 | 1368 | 1440 | 1512 | 1584 | 1656 |
| Ctan | 3456 × 10 | 3600 | 3744 | 2016 | 2160 | 2304 | 2448 | 2592 | 2736 | 2880 | 3024 | 3168 | 3312 |
| Sec | 6912 × 10 | 7200 | 7488 | 4032 | 4320 | 4608 | 4896 | 5184 | 5472 | 5760 | 6048 | 6336 | 6624 |
| Csc | 13824 | 14400 | 14976 | 8064 | 8640 | 9216 | 9792 | 10368 | 10944 | 11520 | 12096 | 12672 | 13248 |
| Sin | 27648 | 28800 | 29952 | 16128 | 17280 | 18432 | 19584 | 20736 | 21888 | 23040 | 24192 | 25344 | 26496 |
| Cos | 55296 | 57600 | 59904 | 32256 | 34560 | 36864 | 39168 | 41472 | 43776 | 46080 | 48384 | 50688 | 52992 |

Once the two irrational values of the horizontal and the vertical cells are calculated, they will be truncated accordingly and then passed on, along with the seed, to the RBG.

3. The Random Bit Generator (RBG)

The RBG utilizes a specific mathematical function that takes the seed output of the AI as its initial argument and the two irrational numbers of the Functions Table as the arithmetic mod parameters. From there, it iterates on each calculated value to calculate new ones that are then concatenated to create a randomized sequence of bits.

The RBG general design is based on the cryptographically-secure Blum-Blum-Shub (BBS) generator2. But while the arithmetic mod in the original BBS is computed from the product of a couple of prime numbers, in the CrownRNG case, we use the truncated irrational numbers coming from the Functions Table instead.

We can think of the RBG function as occupying the inner cells of the Function table, taking its parameters from the X and Y axis, and outputting a value based on these parameters and the seed.

The general concept of the BBS generator goes as follows:
1. Two primes p and q of specific bit-length are chosen such that each is congruent to 3 modulo 4: p≡q≡3 mod(4). (In the CrownRNG case, the two primes are replaced with two truncated irrational numbers, I1 and I2, that satisfy the same mod(4) requirement.)
2. The two prime numbers (irrational numbers in our case) are multiplied to generate n, the arithmetical mode by which the generator will perform its calculations.
3. A random integer s (the seed) is generated from another physical true random number generator, having a length in the interval of [1, n−1] (in the CrownRNG case, the seed is generated by the AI.)
4. The seed will initiate the generation process through the operation $x_0 = s^2 \mod(n)$.
5. The function $x_i = x_{i-1}^2 \mod(n)$ is then used to iterate over each previously calculated value, generating new values for every iteration and outputting a string of numbers: $x_1, x_2, x_3, \ldots, x_k$.
6. Next, the output values are converted into a string of binary bits.
7. The bit-parity of each binary number is determined depending on the type of parity, even or odd (0 or 1).
8. Finally, the parity digits are concatenated to form the desired CSPRN, depending on the required bit-length of the key, which also determines the level of security: $Y = y_1 y_2 y_3 \ldots y_k$.

As mentioned above, the only modification the RBG introduces to the original BBS is replacing the prime numbers with the irrational ones. The usage of prime numbers in the original BBS is a must if we want to have the ability to reverse the direction of the generator, as in the case when the BBS system is used as an encryption/decryption algorithm. However, as we do not want to reverse the operation in our system, there is no problem with using numbers that are not prime. In fact, this introduces additional security to the system because when we compare the limited amount of prime numbers having specific bit-length to the infinite amount of potential irrational numbers of the same bit-lengths, the infinity factor introduces an extra advantage when it comes to the security of the generator against cyber-attacks that try to predict these values.

Figure 5:
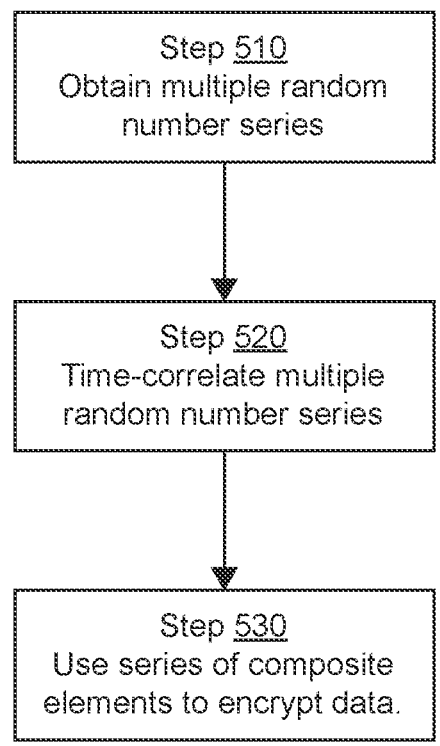
FIG. 5 illustrates a method of encrypting data according to embodiments of the inventive subject matter.

FIG. 5 illustrates a method of encrypting data according to embodiments of the inventive subject matter.

At step 510, a computing device produces or otherwise obtains multiple series of random numbers. In this example, it produces three series of random numbers (a first series, a second series, a third series). The series of random numbers can be produced according to the techniques discussed herein or through other known techniques.

At step 520, the computing device time-correlates the first, second and third series of random numbers to produce a series of composite elements.

Time correlation is considered to refer to a synchronization or matching up of separate random number series that may or may not have been generated contemporaneously. Thus, at step 520, the computing device time-correlates the first, second and third series of random numbers by synchronizing them in time or otherwise matching them up such that when run through a time-dependent application or function (e.g., musical or video playback), the first, second and third series of random numbers have synchronous correlations between them. The time correlation can be performed, for example, according to a matching of number positioning in each of the series of random numbers (e.g., align the $10^{th}$ number of each) or according to a bit position of each of the series of random numbers.

The series of composite elements is thus considered to be the synchronized assembly of the first, second and third series of random numbers. In embodiments, this could be thought of as a series of matrices containing the time-correlated elements of each of the first, second and third series of random numbers.

In embodiments, successive elements in the portion of the composite series of elements are separated in time by no more than a millisecond. In other embodiments, successive elements in the portion of the composite series of elements are separated in time by no more than a microsecond.

In embodiments, the computing device can utilize the portion of the series of composite elements as corresponding to different characteristics of a musical composition. For example, the series of composite elements could correspond to notes in a musical composition. Other contemplated characteristics could include a sound frequency, note length, tone, tempo, musical key, volume, etc.

For example, in these embodiments, the computing device can further map different sequences of the first series of random numbers to frequencies of different ones of the notes. Likewise, the computing device maps different sequences of the second series of random numbers to note lengths of the notes and maps different sequences of the third series of random numbers to tempos of the corresponding different parts of the musical composition.

In variations of these embodiments, the computing device can apply artificial intelligence to apply the notes, length of notes, and/or the tempo in a melody of the musical composition.

At step 530, the computing device uses a portion of the series of composite elements as a key and uses the key to encrypt the data. To derive the key from the series of composite elements, the computing device can apply starting information for the composite elements and a length that results in the portion of the series of composite elements to use as the key. For example, the starting information can be a starting position within the series of composite elements such as a numeric position, a bit position, a start time, a start frame, etc. The length can be a numeric length, a character length, a bit size, a duration, etc.

For the above example of a musical composition, the key can be a portion of the musical composition denoted by a starting point in the musical composition and a length of the portion of the musical composition that contains the series of composite elements. The information used as a key would then be contained within the musical composition.

The use of a starting point and length of a number or other sequence for the purposes of generating a key is discussed in Applicant's own U.S. patent application Ser. No. 17/018,582 titled "Method of Storing and Distributing Large Keys" filed on Sep. 11, 2020. Application Ser. No. 17/018,582 is incorporated herein by reference in its entirety.

To decrypt the data, the same process of FIG. 5 would be used. In situations where the encrypted data is sent, the sender sends the musical composition (or a link to the musical composition). In this case, the shared secret that is known ahead of time could be the starting point and length, as well as the aspects of the musical composition containing the key (in this case, the notes, note length and tempo). This way, a middle-man intercepting the musical composition information only would not know how to apply the musical composition to derive the decryption key.

In embodiments, the portion of the series of composite elements used as the key is a one-time pad. This one-time pad can comprise at least 10,000 digits.

It should be noted that while a musical composition is used as a carrier for the key in the example above, the inventive subject matter is not limited to this method of carrier. A video could be similarly used to convey a key, where the different elements of the different series of random numbers could be made into different characteristics of a video clip. Likewise, a sound or musical composition could be rasterized into an image and the key then distributed within the rasterized image.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of encrypting and decrypting data, comprising:
    using at least a first computing device to produce at least first, second, and third series of random numbers;
    time-correlating at least the first, second, and third series of random numbers to produce a series of composite elements; and
    utilizing a portion of the series of composite elements as a key to encrypt or decrypt the data; and
    utilizing the series of composite elements as notes in a musical composition.

2. The method of claim 1, wherein successive elements in the portion of the composite series of elements are separated in time by no more than a millisecond.

3. The method of claim 1, wherein successive elements in the portion of the composite series of elements are separated in time by no more than a microsecond.

4. The method of claim 1, further comprising mapping different sequences of the first series of random numbers to frequencies of different ones of the notes.

5. The method of claim 1, further comprising mapping different sequences of the second series of random numbers to note lengths of different ones of the notes.

6. The method of claim 1, further comprising mapping different sequences of the third series of random numbers to tempos of different parts of the musical composition.

7. The method of claim 1, further comprising mapping different sequences of the first series of random numbers to frequencies of different ones of the notes, and mapping different sequences of the second series of random numbers to note lengths of different ones of the notes.

8. The method of claim 7, further comprising mapping different sequences of the third series of random numbers to tempos of different parts of the musical composition.

9. The method of claim 1, further comprising utilizing artificial intelligence to include the notes in a melody of the musical composition.

10. The method of claim 1, wherein the portion of the series of composite elements used as the key comprises a one-time pad.

11. The method of claim 10, wherein the one-time pad comprises at least 10,000 digits.

12. The method of claim 1, further comprising wherein the time-correlating comprises matching at least one of a number positioning and a bit position in each of the first, second and third series of random numbers.

\* \* \* \* \*